July 30, 1929.　　　K. KARNATH　　　1,722,752
SLIDE VALVE
Filed Nov. 18, 1926　　　3 Sheets-Sheet 1
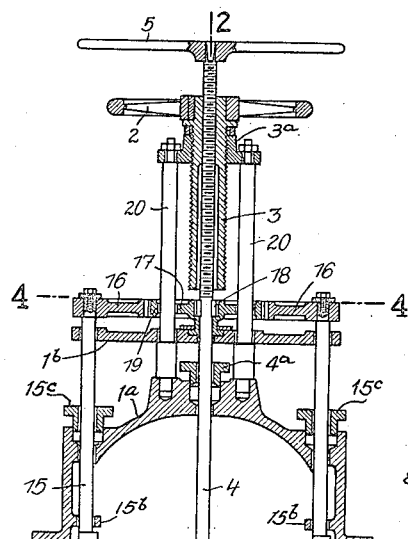
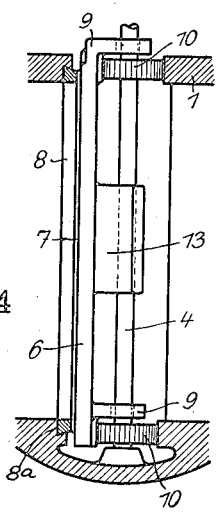
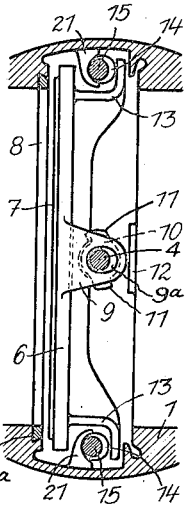
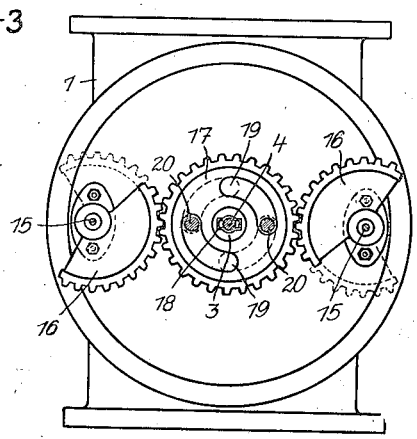
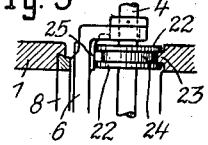
Inventor:
Kurt KARNATH
by:
Lotka, Kehlenbeck & Farley
Attorneys.

July 30, 1929.  K. KARNATH  1,722,752
SLIDE VALVE
Filed Nov. 18, 1926  3 Sheets-Sheet 2
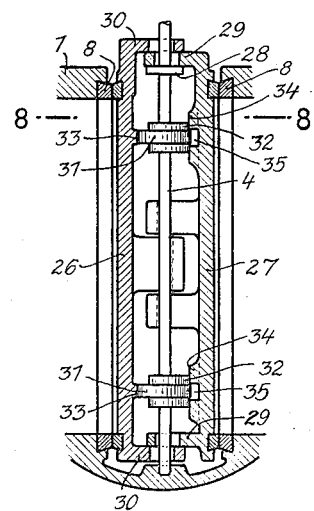
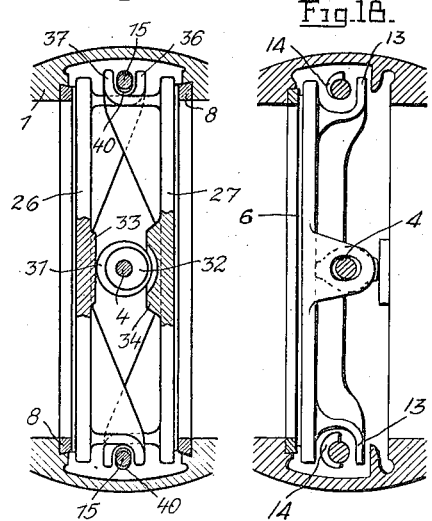
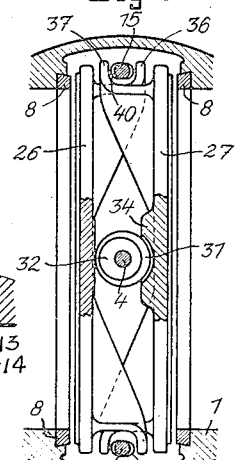
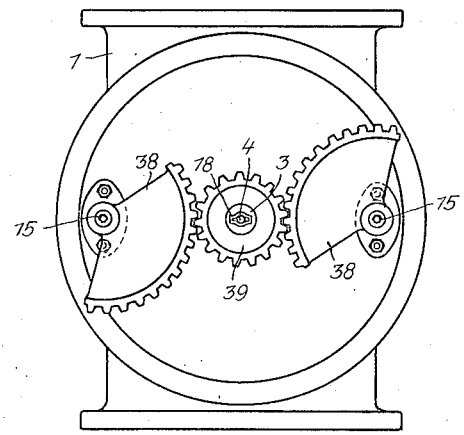
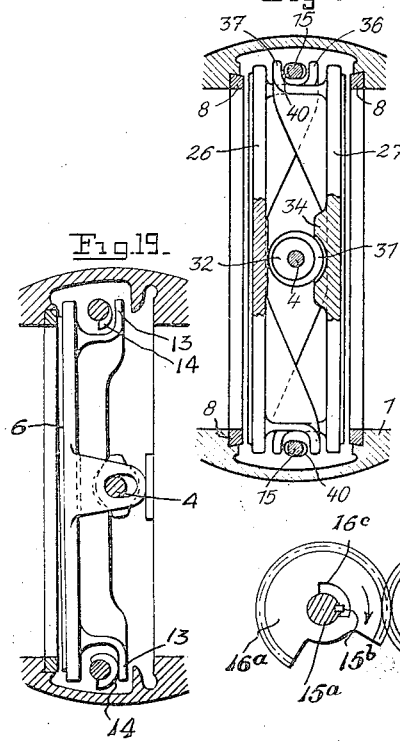
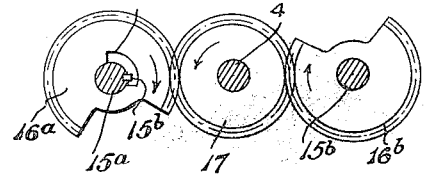
Inventor:
Kurt KARNATH
by:
Lotka, Kellenbeck & Farley
Attorneys.

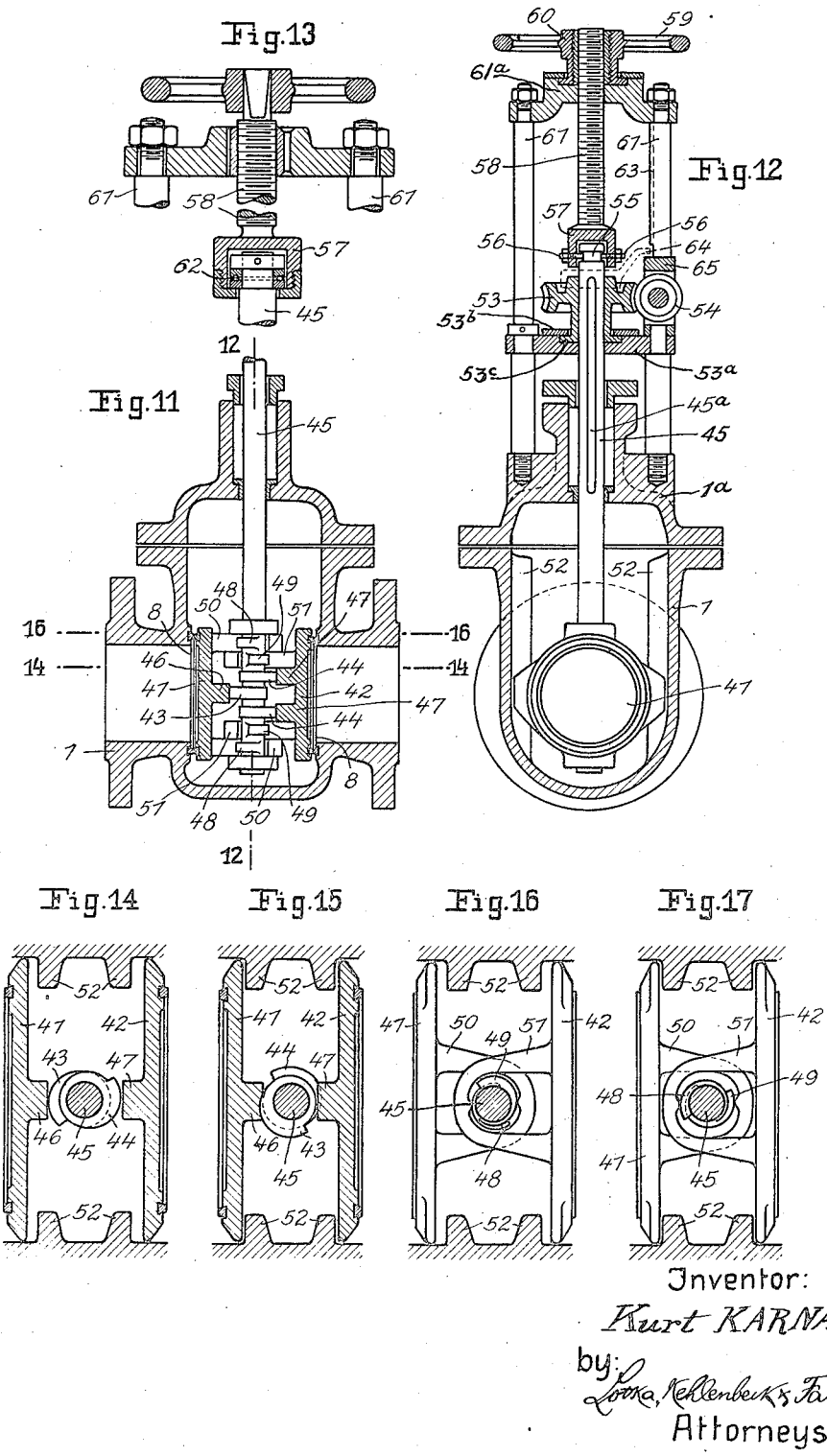

Patented July 30, 1929.

1,722,752

UNITED STATES PATENT OFFICE.

KURT KARNATH, OF ZWEIBRUCKEN, GERMANY.

SLIDE VALVE.

Application filed November 18, 1926, Serial No. 149,136, and in Germany November 22, 1925.

My invention relates to improvements in slide valves, and more particularly in valves for high pressure conduits in which high power is needed for opening and closing the valve. The object of the improvements is to provide a valve of this type in which the power required for moving the slide valve disk or gate is reduced. In the preferred form of my invention, the said disk or gate is made with a sufficient degree of flexibility to be pressed tightly against its seat when the pressure of the steam or other medium is exerted toward said seat. Furthermore, such flexibility enables the valve disk to be lifted off its seat at one or more points of its periphery while the remaining portion of the periphery is still seated, thus facilitating the opening of the valve. As a rule, I provide devices for pressing the disk or gate against its seat, and separate valve-lifting members engaging the edge portion of said disk or gate at other points. By reason of this flexibility, the valve disk or gate is capable of being slightly bent by the said members away from its seat thus permitting the flow of the pressure fluid through the gap thus produced and relieving the fluid pressure on the gate before completely unseating and shifting the same in a direction parallel to its seat. In the preferred construction the said members are disposed so as to engage the gate one after the other. Thereby the power needed for opening the gate is further reduced.

Other objects of the invention will appear from the following description.

For the purpose of explaining the invention several examples embodying the same have been shown in the accompanying drawings, in which the same reference characters have been used in all the views to indicate corresponding parts. In said drawings, Fig. 1 is a sectional elevation showing a valve provided with one slide valve disk, Fig. 2 is a partial sectional elevation on an enlarged scale taken on the line 2—2 of Fig. 1 and showing the valve disk in closing position, Fig. 3 is a sectional plan view on an enlarged scale taken on the line 3—3 of Fig. 1 and showing the valve disk away from its seat, Fig. 4 is a sectional plan view on an enlarged scale taken on the line 4—4 of Fig. 1, Fig. 5 is a detail view showing a modification of a part of the valve shown in Figs. 1 to 4, Fig. 6 shows an elevation and a top and bottom view of a detail used in the modification illustrated in Fig. 5, Fig. 7 is a sectional elevation of the bottom part of a modification of the valve in which two valve disks are provided, both disks being shown in closing position, Fig. 8 is a sectional plan view taken on the line 8—8 of Fig. 7, the valve disks being shown in closing position, Fig. 9 is a sectional plan view showing the valve disks away from their seats, Fig. 10 is a top-plan view similar to the one shown in Fig 4, Fig. 11 is a sectional elevation showing another modification of the valve, Fig. 12 is a sectional elevation taken on the line 12—12 of Fig. 11, Fig. 13 is a sectional elevation on an enlarged scale showing a modified connection between the parts of the rotary valve stem, Fig. 14 is a sectional plan view on an enlarged scale taken on the line 14—14 of Fig. 11 and showing the valve disks in closing position, Fig. 15 is a similar sectional plan view showing the valve disks away from their seats, Fig. 16 is a sectional plan view on an enlarged scale taken on the line 16—16 of Fig. 11 showing the valve disks in closing position, Fig. 17 is a similar sectional plan view showing the valve disks away from their seats;

Figs. 18 and 19 are views of the same character as Fig. 3, showing a modified construction in two different positions; and Fig. 20 is a diagrammatic horizontal section illustrating a further modification.

In the example shown in Figs. 1 to 4 my improved valve comprises a casing 1 closed at its top by a head 1ª, a sleeve 3 formed with inner and outer screw-threads and screwing in a plate or boss 3ª mounted by means of rods 20 on the top part of the head 1ª. To the top end of the said sleeve a hand wheel 2 is keyed, and through the sleeve is screwed a valve stem 4 provided at its top with arms 5, the said stem 4 being passed into the casing 1 through a stuffing box 4ª. In an annular recess 8ª formed internally in the wall of the casing 1 a ring 8 is fitted which provides a seat for a valve disk or gate 6 provided with a suitable packing 7. At the top and bottom the said disk 6 is made integral with ears 9 formed with slots 9ᵃ and the stem 4 is passed through the said slots with a certain clearance. Below the said ears the valve stem 4 carries cam disks 10 formed at diametrically opposite points with lugs 11, one of the lugs of each cam being adapted for engagement with the disk 6 at the upper and the lower portions thereof respectively, while the other lug 11 is adapted to engage an abutment lug or shoulder 12 formed on the wall of the casing 1. Further, the valve disk 6 is formed at diametrically opposite points with hooks 13 located substantially in the horizontal median plane passing through the disk, and into the space enclosed between the said hooks and the margin of the disk 6 project lugs 21 which are cast integral with the wall of the casing 1. Between the said lugs and the hooks elongated cams 14 are located which are made integral with stems 15 guided in step bearings 15ᵃ, ears 15ᵇ, and stuffing boxes 15ᶜ, and carrying at their top ends toothed segments 16 meshing with a gear wheel 17 mounted on the stem 4, the said gear wheel being connected with the stem 4 by means of feathers 18 and being journaled and held against axial movement, in a fixed crossmember 1ᵇ, so that said wheel 17 will rotate in unison with the stem 4 but is not longitudinally shiftable therewith. The gear wheel 17 is formed with segmental slots 19 through which the rods 20 are passed.

If it is desired to close the valve, the hand wheel 2 is first rotated to lower the gate 6 into registry with the seat 8, the gate being guided by the hooks 13 engaging the elongated cams 14, and the lugs 11 being in the position shown in Fig. 3 and out of engagement with the gate. Then the stem 4 is rocked by means of the arms 5 in the proper direction for pressing the lugs 11 toward the gate and the abutment 12. Through the intermediary of the gear wheel 17 and the segments 16 the cams 14 are simultaneously rocked into position for releasing the hooks 13. Thus the gate is pressed against its seat by the lugs 11.

For opening the valve the stem 4 is first rocked in the opposite direction and the cam disks 10 are moved with relation to the cams 14 so that at first the lugs 11 release the gate, and thereafter the cams 14 engage the hooks 13 in the proper direction for pressing the gate away from its seat. By reason of the large diameter the gate has a certain elasticity, so that when rocking the stem 4 in the manner described the gate is slightly bent away from the seat 8 at the sides engaged by the cams 14. Thus slight gaps are produced at the said sides through which the pressure fluid such as steam flows to the opposite side of the gate thus relieving the gate of the pressure of the steam. Now the whole gate can easily be moved away from its seat, whereupon it is lifted by rotating the hand wheel 2.

In the construction so far described the gate is simultaneously bent outwardly by the cams 14 at both sides. In some cases the cams 14 or the toothed segments 16 are constructed so that one lags behind the other. For instance, Fig. 20 shows an arrangement in which the toothed segment 16ᵇ always rocks in unison with its stem or shaft, and with the gear 17 and toothed segment 16ᵃ, whereas the latter is mounted on its stem or shaft 15ᵃ in such a manner as to permit a certain independent rocking movement of the segment 16ᵃ relatively to its shaft, as by providing the latter with a key 15ᵇ projecting into an arcuate slot 16ᶜ of the segment 16ᵃ. Thus, when rocking the stem 4 in the proper direction for unseating the gate at first one of the cams 14 engages the hooks 13 and thereafter the other cam. Thereby the power required for unseating the gate 6 is reduced. The same result is obtained when providing the cams 14 with different cam faces adapted for successive engagement with the hooks 13. Such an arrangement is shown in Figs. 18 and 19; in Fig. 18, the valve or gate is closed, and both cams 14 are out of engagement with the respective hooks 13; in Fig. 19, one of the cams has actuated one of the hooks 13 sufficiently to lift the valve off its seat at that point, while the other cam has not yet acted on the valve.

In the construction shown in Fig. 1 the radii of the cam faces of the lugs 11 of the cam disks 10 and the cam faces of the cams 14 are comparatively small, so that the cams have a comparatively large gradient, the rocking movement of the stem 4 and the segment 16 being not more than 90 degrees. In the modification shown in Figs. 5 and 6 the length of the cam faces engaging the gate 6 is considerably increased by providing cam disks 22 for pressing the gate on its seat and separate cam disks 24 engaging the abutments 23, both cams being fixed to the stem 4. The rear support 23 is constructed so that the cam disk 22 can be moved without engaging such abutment, and the face 25 provided on the gate 6 in position for being engaged by the cam disks 22 is constructed so that it does not interfere with the rocking movement of the cam disks 24. In the construction shown in Fig. 5 the cam disks 22 and 24 are made integral with each other, and as a matter of fact they constitute a single cam formed with a plurality of cam faces.

By thus providing separate cams to engage the gate and the abutment respectively the length of the operative portions of the said cams can be considerably increased. In the example shown in the figures the said length corresponds to an angle of 270 degrees. Therefore the radii of the cam disks can be considerably increased, so that the power required for operating the stem 4 is reduced. Further, friction increases as the diameter of the cam disks 22, 24 is increased, so that accidental opening of the gate is made impossible.

In Figs. 7 to 10 I have shown a modification in which two gates 26 and 27 are provided. As shown, the gates are provided at their top and bottom ends with adjacent ears 29 and 30 respectively formed with slots for the passage of the stem 4, which stem is formed with a collar 28 engaging the bottom face of the upper ear 29. For pressing the gates 26 and 27 on their seats cam disks 31, 32 are provided, which are adapted for engagement with abutments 33 and 34 respectively formed on the gates. The construction of the cam disks and the abutments 33 and 34 is similar to the one described with reference to Figs. 5 and 6, and each cam comprises two cam faces 32 engaging the abutments 34 and an inner cam face 31 engaging the abutment 33. The abutments 34 are spaced from each other so as to permit the cam face 31 to pass into the recess 35 provided between said abutments, and the thickness of the abutment 33 does not exceed the thickness of the cam 31, so that said abutment 33 is not engaged by the cam faces 32. Thus the cams may be constructed with long operative faces and so as to be practically proof against accidental movement. The gates 26 and 27 are made integral with adjacent lateral hooks 36 and 37, and the spindles 15 formed at opposite sides with cams 40 extend between the said hooks. The spindles 15 are operatively connected with the stem 4 in the same way as has been described with reference to Figs. 1 to 4. The cams 40 are offset with relation to the cams 31 and 32 so that the cams 40 are out of engagement with the hooks 36 and 37 when the cams 31 and 32 are in engagement with the gates, and vice versa.

While the gates are moving downwardly and into position in front of the seats 8 the cams 40 provide guides for the said gates. The gates are closed by rocking the stem 4, whereby the cams 40 release the hooks 36 and 37 and the cam disks 31 and 32 engage respectively the gates 26 and 27 for pressing the same on their seats. By reason of the small gradient of the cam disks 31 and 32 the construction is proof against accidental opening of the gates.

For opening the valve the stem 4 is rocked in the proper direction for throwing the cams 31 and 32 out of engagement with the gates 26 and 27, and for throwing the cams 40 into engagement with the hooks 36 and 37, the said cams 40 tending to force the gates toward each other. By reason of the elasticity the gates are bent away from the seats at the sides where the pressure of the cams 40 is exerted, and the steam rushes through the gaps thus produced and relieves the gates, whereupon both gates can be unseated and shifted upwardly without considerable power being needed. During the upward movement of the gate the cams 40 provide guides for the hooks 36 and 37.

It appears from the foregoing description that only one set of cams, that is either the cams 31 and 32 or the cams 40 are in engagement with the gates 26 and 27, which is important in the case of superheated steam because thereby sticking of the cam members to the gates or their rear supports is made impossible.

As appears from Fig. 10, the radius of the segments 38 keyed to the spindles 15 is larger than that of the gear wheel 39 keyed to the stem 4. Thereby the power required for unseating the gates 26 and 27 is further reduced.

In the modification shown in Figs. 11 to 17 the cam disks 43 and 44 for pressing the gates 41 and 42 on their seats and keyed to a stem 45 are disposed so as to engage the gates 41 and 42 at the the middle thereof, the said gates being provided with abutments 46 and 47 adapted for engagement with the cam disks. The cam members 48 and 49 for unseating the gates are disposed coaxially with the cam disks 43 and 44 and keyed to the same stem 45, the cam disks 48 and 49 engaging the gates at points near the margins thereof. The gates are made integral with ears 50 and 51 disposed one above the other, the stem 45 extending through the spaces enclosed by the said ears. The cam disk 48 acts on the ear 50 and the cam disk 49 on the ear 51, both being capable of unseating the gates.

The cam disks 42 and 43 are offset with relation to the cam disks 48 and 49 in the manner described with reference to Figs. 1 to 10. For guiding the gates ribs 52 are provided.

Outside the casing 1 the stem 45 carries a worm wheel 53 rotatably mounted on a fixed plate 53$^a$ and held against longitudinal displacement by means of a plate 53$^b$ engaging a flange 53$^c$ on the hub of the said wheel. Thus the worm wheel is adapted to impart rotary movement to the stem 45, but it does not take part in the longitudinal displacement thereof, a feather fixed to the worm wheel being longitudinally shiftable in an elongated groove 45$^a$ of the stem. The worm wheel 53 is in engagement with a worm 54. Thus great power can be applied for rocking the stem 45 in the proper directions for unseating and seating the gates 41 and 42. At its top end the stem 45 is formed with a neck 55 engaged by screws 56 fixed to a head 57 provided on a screw-threaded spindle 58 screwing in the hub 60 of a hand wheel 59, the said hub being rotatably mounted in a cross-head 61ᵃ mounted through the intermediary of rods 61 on the head 1ᵃ of the casing 1. Thus by rotating the hand wheel 59 the spindle screws in the hub 60 so as to raise or lower the gates 41 and 42.

In the modification shown in Fig. 13 the stem 45 is connected with the screw-threaded spindle through the intermediary of an anti-friction bearing 62 disposed within the head 57 of the said spindle.

As shown in Fig. 12 in dotted lines, one of the rods 61 is formed with a longitudinal groove 63 ending at its bottom end in a transverse recess 65, the said groove being adapted for engagement by an arm 64 fixed to the top end of the stem 45. When the gates are in their lowermost position the arm 64 is in the position in which it can be rocked out of engagement with the groove 63 and the recess 65 by means of the worm gearing 53, 54.

When the valve is open the gates 41 and 42 are in the position shown in Figs. 15 and 17. While the stem 45 and the spindle 58 are moving downwardly the gates are guided on the ribs 52, the stem 45 being held against rotary movement by the arm 64 engaging in the groove 63. When the gates are in the position in front of the seats 8 the arm 64 engages in the recess 65, so that the stem 45 can be rocked by means of the worm gearing 53, 54 for throwing the cam disks 43, 44 into engagement with the abutments 46, 47 and pressing the said gates apart and on their seats, this closed position of the gates being shown in Figs. 14 and 16.

When the gates are forced apart the cam disks 48 and 49 are out of engagement with the ears 50 and 51.

For opening the gate the worm gearing is first rotated in the proper direction for throwing the cams 43 and 44 out of engagement with the abutments 46 and 47 and for throwing the cam disks 48 and 49 into engagement with the ears 50 and 51, thus slightly lifting the gates at opposite ends away from the seats and permitting the pressure fluid to pass through the gap thus formed between the gates and their seats. After the gates have thus been relieved from the pressure of the fluid they can be easily unseated and raised.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. A valve, comprising a valve casing provided internally with a seat, a slide valve disk capable of being slightly bent away from its seat, means to move said disk in a direction parallel to its seat, and a member adapted for engagement with the margin of said disk and to bend the same away from said seat.

2. A valve, comprising a valve casing provided internally with a seat, a slide valve disk capable of being slightly bent away from its seat, means to move said disk in a direction parallel to its seat, a member adapted to press said disk onto its seat, and a member separate from said pressing member adapted for engagement with the margin of said disk and to bend the same away from said seat.

3. A valve, comprising a valve casing provided internally with a seat, a slide valve disk capable of being slightly bent away from its seat, means to move said disk in a direction parallel to its seat, and means to bend said disk away from its seat and comprising members in position for engaging the disk at opposite portions.

4. A valve, comprising a valve casing provided internally with a seat, a slide valve disk capable of being slightly bent away from its seat, means to move said disk in a direction parallel to its seat, a member adapted to press said disk onto its seat, and means to bend said disk away from its seat and comprising members separate from said pressing member in position for engaging the disk at opposite portions.

5. A valve, comprising a valve casing provided internally with a seat, a slide valve disk capable of being slightly bent away from its seat, means to move said disk in a direction parallel to its seat, a member adapted to press said disk onto its seat, and means to bend said disk away from its seat and comprising cam members separate from said pressing member in position for engaging the disk at opposite portions.

6. A valve, comprising a valve casing provided internally with a seat, a slide valve disk capable of being slightly bent away from its seat, means to move said disk in a direction parallel to its seat, a member adapted to press said disk onto its seat, means to bend said disk away from its seat and comprising cam members separate from said pressing member in position for engaging the disk at opposite portions, and an abutment co-operating with said pressing member, the latter being formed with pairs of lugs one in position for engagement with said disk and the other for engagement with said abutment.

7. A valve, comprising a valve casing provided internally with a seat, a slide valve disk capable of being slightly bent away from its seat, means to move said disk in a direction parallel to its seat, a member adapted to press said disk onto its seat, means to bend said disk away from its seat and comprising cam members separate from said pressing member in position for engaging the disk at opposite portions and abutments for said cam members, each of said cam members being formed with a pair of cam faces one in position for engagement with said disk and the other one for engagement with one of said abutments.

8. A valve, comprising a valve casing provided internally with a seat, a slide valve disk capable of being slightly bent about a line spaced from its margin and formed at one side with a hook shaped member projecting away from the valve seat at the marginal portion of the disk, means to move said disk in a direction parallel to its seat, a cam member embraced by said hook shaped member, and means to rock said cam member in a direction for pressing said disk away from its seat.

9. A valve, comprising a valve casing provided internally with a seat, a slide valve disk capable of being slightly bent away from its seat and formed at one side with a hook shaped member projecting away from the valve seat at the marginal portion of the disk, means to move said disk in a direction parallel to its seat, a cam member embraced by said hook shaped member, an abutment for said cam member adjacent said hook shaped member, and means to rock said cam member in a direction for pressing said disk away from its seat.

10. A valve, comprising a valve casing provided internally with a seat, a slide valve disk capable of being slightly bent away from its seat, means to move said disk in a direction parallel to its seat, a cam member adapted to press said disk onto its seat, a cam member located in position for engaging said disk at its margin and for bending the same, spindles carrying said cam members, and gearings on said spindles adapted to transmit rocking movement from one to the other.

11. A valve, comprising a valve casing provided internally with a seat, a slide valve disk capable of being slightly bent away from its seat, means to move said disk in a direction parallel to its seat, a cam member engaging said disk and adapted to press the same onto its seat, cam members respectively located in position for engaging the said disk at its margin at opposite sides and adapted to bend the said disk, spindles connected with said cam members, and interengaging gearings on said spindles adapted to transmit rocking movement from one to the other.

12. A valve comprising a valve casing provided with a seat, a valve proper adapted to engage said seat, a device for holding said valve proper against its seat, and a separate device for lifting the valve proper off its seat at one portion of such valve proper while the remaining portion of such valve proper is still being held against its seat by the first-mentioned device.

13. A valve comprising a valve casing provided with a seat, a valve proper adapted to engage said seat, a device for holding said valve proper against its seat, and two devices, separate from said valve-holding device, for lifting the valve proper off its seat at diametrically opposite portions while the remaining portions of the valve proper are still being held against its seat by the first-mentioned device.

14. A valve comprising a valve casing provided with a seat, a valve proper adapted to engage said seat, a device for holding said valve proper against its seat, two devices, separate from said valve-holding device, for bending the valve proper and lifting it off its seat at diametrically opposite portions while the remaining portions of the valve proper are still being held against its seat by the first-mentioned device, and a unitary actuating mechanism for said valve-lifting devices, constructed to first lift the valve off its seat at one portion only and subsequently at the diametrically opposite portion.

15. A valve comprising a valve casing provided with a seat, a valve proper adapted to engage said seat and having sufficient flexibility to permit a portion of the valve being moved away from such seat while the remaining portion of the valve is still in contact with the seat, and means for separating such valve from its seat locally.

In testimony whereof, I hereunto affix my signature.

Dr. KURT KARNATH.